ical Corporation, New York, N.Y.
United States Patent Office 3,590,006
Patented June 29, 1971

3,590,006
AEROSOL COMPOSITIONS USEFUL IN PREPARATION OF THIN-LAYER CHROMATOGRAPHY PLATES
Walter Page, Convent Station, and William Russell Schevey, Mount Freedom, N.J., assignors to Allied Chemical Corporation, New York, N.Y.
No Drawing. Continuation-in-part of abandoned application Ser. No. 589,850, Oct. 27, 1966. This application Sept. 13, 1967, Ser. No. 667,381
Int. Cl. C09k *3/30, 3/00;* B01d *15/08*
U.S. Cl. 252—408
9 Claims

ABSTRACT OF THE DISCLOSURE

This application relates to a method for preparation of thin-layer chromatography plates by spraying backing plates with certain aerosol compositions, and to the aerosol compositions, which comprise a powdered adsorbent, a binder, a dispersion means and a propellant. The following is an example of a preferred composition:

|  | G. |
|---|---|
| Powdered silica gel | 15.0 |
| Elvamide 8063 polyamide resin | 2.6 |
| Ethanol | 36.4 |
| Methylene chloride | 26.0 |
| Monochlorodifluoromethane | 20.0 |
|  | 100.0 |

The compositions are particularly useful in that they contain a binder which binds the composition firmly to the backing plate.

CROSS-REFERENCE TO RELATED APPLICATION

This application is a continuation-in-part of U.S. application Ser. No. 589,850, filed Oct. 27, 1966, now abandoned.

The term chromatography as used herein refers to an analytical technique for separation of the components of certain mixtures of organic and inorganic substances (primarily organic substances, for example, hydrolysates, mixed alkaloids, etc.). The separation is achieved by means of passing the mixtures through a selective adsorption medium, which, due to differences in polarity of the components, allows some components to pass through the medium more readily than others according to the degree of adsorption. Thin-layer chromatography is chromatography performed on an open thin layer of an adsorbent material (usually silica gel) which is supported by a backing plate of glass, plastic or a similar material. The adsorbent-coated backing plate is commonly called a plate. Such chromatography is particularly useful for analyzing mixtures of which only a small amount of sample is available, since the amount of mixture is often too small to analyze by distillation or by other chromatography techniques. It is also useful in analyzing heat sensitive mixtures since heat sensitivity may cause components of a mixture to break down upon heating, thus precluding separation by such means as fractional distillation.

In use of a plate, solutions of samples of the mixtures to be analyzed are spotted in a horizontal line on the adsorbent-coated surface of the plate using a micropipette. After the samples have dried, the plate is placed vertically in a small closed chamber, the atmosphere of which is saturated with a solvent suitable for the material being analyzed, with the bottom edge of the plate immersed in a small trough of the same solvent. As the solvent front creeps up the adsorptive surface of the plate and past a sample spot, it carries a solution of the mixture sample with it. Due to differences in polarity between the various components of the sample solution, the components are adsorbed at different levels on the plate as the solvent front creeps up the adsorptive surface thereof. The action is stopped by removing the plate from the chamber before the front reaches the top of the plate. After a brief drying period, during which the solvent evaporates from the plate, the plate can be visually analyzed to determine the number of components separated thereon. If the components separated on the plate are not distinctly visible in ordinary light or if the adsorbent used is difficult to see through (for example, carbon), known development procedures may be used, such as spraying the plate with a fluorescing composition and then viewing it under ultraviolet light. Other known developing procedures use heat or developing agents such as iodine vapor, acids, alkalis, dyes, etc., the purpose being to render the separated components distinctly visible.

In practice this type of chromatography can be used, for example, to determine the number of components of a mixture having an unknown number of components. This is done by examining the separation of components on an adsorbent-coated backing plate, the various components being deposited at different levels on the plate. Also, if it is desired to compare an unknown mixture with a known mixture to determine if the two are the same, the separation of the unknown mixture can be compared with the separation of the known mixture, and it can thus be determined if the two are the same. If they are, the plates will show the same separation pattern. Furthermore, if it is desired to analyze a particular component, the area in which that component was adsorbed can be scraped from the plate and the sample thus obtained can be analyzed by conventional means.

Thin-layer chromatography requires the preparation of chromatographic plates by applying a thin layer of adsorbent material to a glass or similar type of backing plate. In order to produce accurate separation results, the layer must be applied to each plate with fairly uniform thickness (although some variance in the thickness from plate to plate is permissible), i.e. with a minimum of bubbles, ripples, etc.

There are in the prior art three principal types of plates for thin-layer chromatography.

The first type is an adsorbent-coated glass plate which is prepared in the laboratory when needed by mixing silica gel with a dispersion medium such as water and applying a thin layer of the resultant slurry to the surface of a clean backing plate by means of a special spreader. This type of plate has the advantage that the user can, in preparing the plates, vary the coating thickness and technique from plate to plate. However, it has the disadvantage that the setting up of equipment, mixing of the coating, and subsequent cleaning of equipment are messy and time consuming. Furthermore, there is almost always some of the expensive coating material left in the spreader reservoir which must be used or disposed of promptly before it solidifies, and thus is often wasted. Another disadvantage of self-made plates is their relatively long drying period of 30–60 minutes, since water is generally used as the dispersion medium with the adsorbent material to form the slurry. Furthermore, after drying in air for 30–60 minutes, such plates require an additional 30–60 minutes of drying in an oven before they are ready for use.

The second principal type of chromatographic plate is a commercially prepared adsorbent-coated glass plate made in a manner similar to that described in the previous paragraph. This type of plate has the advantage that it can be purchased in a variety of sizes and requires no treatment before use. Commercially prepared plates are, however, relatively costly and are subject to breakage or other damage in shipment. Furthermore, these plates must also be heated in an oven for a short period of time before use to drive off any water that the adsorbent has accumulated during transit and storage.

The third prior art type of chromatographic plate is a commercially prepared precoated synthetic sheet, such as poly(ethylene terephthalate) coated with silica, which requires no treatment before use other than cutting to the desired plate size. However, the very thin silica layer (100 microns thick vs. 250 microns thick for a conventional plate) which is characteristic of this type of plate limits the size of the sample which can be used therewith and thus restricts the use of this type of plate to mixtures requiring no more than 5 microliters of sample (as compared with the 250 microliter sample size which can be used with the 250 micron thickness adsorbent of a conventional plate). This sample size restriction prohibits the use of these very thinly coated plates with certain multicomponent systems, which generally require a larger sample. Furthermore, the cost of such coated synthetic sheets is quite high, and this type of plate, too, must be heated in an oven for a short period of time before use to drive off any accumulated water.

Due to the disadvantages of the above-mentioned types of chromotographic plates, there was a need in the art for a fast and inexpensive means of preparing thin-layer chromatographic plates of uniform quality in the laboratory.

Toward this end, a modification of the method of preparing the first-mentioned prior art type of plate (i.e. the self-made silica-coated glass plate coated by using a spreader) was tried by others. In this modification an aspirator bottle with an attached, self-contained pressure source was used to spray the coating slurry on the plates instead of using a spreader. This method, however, yielded poor results and in addition retained some of the disadvantages of the spreader method. A high pressure was required to aspirate the slurry from the bottle and such a high pressure was inconsistent with application of a uniform coating, because of the exit blast which it created. Furthermore, there was the disadvantage that the slurry had to be mixed before use and disposed of thereafter and could not be kept in the aspirator bottle to prevent its solidification therein. Also the aspirator bottle had to be thoroughly cleaned after each use.

It was found and was disclosed in copending U.S. application Ser. No. 528 802, of P. D. Dernier and H. Frankel, filed February 21, 1966 now U.S. Pat. No. 3,468,814, issued Sept. 23, 1969, that a coating slurry for thin-layer chromatographic plates can be formulated as a self-propelled aerosol composition and applied by spraying from an aerosol bomb containing in one unitary assembly all the components of the system. Such application of thin layers for chromatographic plates has the advantage that coating can be done rapidly and requires little or no costly setup and clean up time. Furthermore, the aerosol coating composition requires no additional treatment before use other than shaking, and can be stored in the aerosol container and thus need not be disposed of after one use but can be stored and used until the aerosol container is exhausted. Another distinct advantage is that, due to the dispersion media used plates coated by aerosol application dry in a short time (for example, 5–10 minutes) compared to plates prepared by spreader or aspirator bottle. The aerosol method of preparing plates is thus quite convenient, rapid and relatively inexpensive, retaining the advantages of prior art sources while eliminating their disadvantages.

Broadly, the aerosol compositions of the previous application consisted of an adsorbent, a dispersion medium, and a propellant. Such compositions, although useful, have been found to have the disadvantage that the adsorbent exhibits a tendency to slough off the backing plate. The problem of finding a binder that would hold the adsorbent layer to the backing plate in every instance and still be compatible with an aerosol system thus arose.

It is known to use a binder such as calcium sulfate to bind an adsorbent layer such as silica gel to a backing plate. However, such binders require an aqueous system which is undesirable because of the previously mentioned problem of long drying time. We have now discovered non-aqueous aerosol compositions including binders which adhere the adsorbent to the backing plate to such an extent that it will not slough off in normal use; however, permitting the adsorbent coating to be washed from or scraped from the backing plate when it is desired to reuse the backing plate.

The present compositions comprise a powdered adsorbent, a binder, a dispersion means, and a propellant.

The powdered adsorbent used in the aerosol compositions of this invention may be silica gel; alumina; diatomaceous earth; fluorocarbon and chlorofluorocarbon polymeric resins, such as polytetrafluoroethylene and polychlorotrifluoroethylene; magnesium silicate; carbon; magnesia-silica gel; cellulose; microcrystalline cellulose; and treated cellulose, such as carboxymethyl cellulose and diethyl aminoethyl anion exchange cellulose. However, this listing is not meant to be limiting and it will be obvious to those skilled in the art that other powdered adsorbents can also be used. We have found silica gel to be the preferred adsorbent. The powder used as the adsorbent must be small enough so as to be properly dispersed in the system and so as not to clog the spray orifice. We have found that an average particle size of about 60 microns or smaller should be used in our compositions. The preferred powder is one wherein the particles are from about 50 microns to about 1 micron in size (i.e. diameter), although even smaller particles may be used as long as they effect a reasonably rapid separation. Adsorbosil S–2, a commercially obtainable silica gel powder preparation having an average particle size of about 40 microns was used as the source of silica gel for the compositions of many of the examples set forth below.

The proportions of adsorbent powder in the aerosol compositions can vary from about 6% to about 30% by weight, the preferred range being about 8% to about 25%, particularly about 15% to about 25%. Below about 6% the aerosol composition does not contain enough adsorbent for economical use; above about 30% the aerosol composition becomes too thick to be easily sprayable.

The binders used in this invention must be soluble in some relatively volatile system which is suitable as a suspending and carrier medium for application of the adsorbent particles to the plates. However, the binders used must also meet the requirement that they cannot be soluble in the commonly used eluting solvents which are known to the thin-layer chromatography art. We have found that binders which can be used in this invention may be polyacrylonitrile resins, polyethylene terephthalate resins; partially cross-linked, room temperature curing polyurethane resins; and polyamide resins. Suitable polyacrylonitrile resins are marketed under the trademark "Orlon." By polyethyleneterephthalate resins we mean to include those resins derived from the reaction of ethylene glycol with a terephthalate. Suitable resins of this type are marketed under the trademark "Dacron." A suitable single component semi-cured epoxy resin is marketed by Ciba Corporation as Araldite 448. A suitable chlorotrifluoroethylene resin is marketed by Allied Chemical Corporation under the trademark Aclar. However, polyamide resins have been found to be the most suitable binders.

One type of polyamide resin which can be used is the reaction product of dimerized linoleic acid with ethylenediamine. This type of resin is thermoplastic and has a softening point in the range from 90–190° C., an amine value in the range from 83 to 400, and a molecular weight in the range from 6000–9000. Such a resin is marketed under the trademark Versamid. Other polyamide resins which can be used are those nylon resins commonly known and hereafter referred to as nylon 6, nylon 66, nylon 6-10, nylon 10 and nylon 11. (Nylon 6 is obtained by polycondensation of caprolactam. Nylon 66 is obtained by condensation of hexamethylene diamine with adipic acid. Nylon 6-10 is obtained by condensation of hexamethylenediamine with sebacic acid. Nylon 10 is made from 10 aminodecanoic acid. Nylon 11 is made from 11-aminoundecanoic acid.) However, the particular polyamides which are preferred are those which satisfy the following equations:

$$X+Y+Z+T=100$$
$$X=4+0.0073(T-45)^2+0.0322[Y-13-0.0043(T-53)^2]^2$$

wherein X equals parts by weight of 6 amino-caproic acid, Y equals parts by weight of hexamethylenediammonium sebacate, Z equals parts by weight of hexamethylenediammonium adipate, and T equals parts by weight of a mixture of hexamethylenediammonium suberate and hexamethylenediammonium azelate in approximately 15:85–30:70 proportions by weight. Such polyamides are disclosed in U.S. Pat. No. 2,285,009 and are marketed under the trademark Elvamide.

It was indeed surprising that the polyamide resins are useful as binders in aerosol compositions of the present type since polyamide resin powders, such as nylon 11, mentioned above as being a suitable adsorbent, have been found to slough off of the backing plate as readily as does silica gel. The successful use of polyamide resins as binders in this invention is enabled by use of certain dispersion means described below. The dispersion means dissolves the binder, thus enabling it to coat the surfaces of the adsorbent powder particles so as to cause them to adhere to each other and to the backing plate when the dispersion means evaporates during and after aerosol application of the composition to the backing plate. The binder will not dissolve in the dispersion means under normal conditions; rather it must be dissolved as described below.

The quality of resinous binder in the composition will depend somewhat on the proportion of powdered adsorbent in the composition, and in general will range between about 4% and about 17.3% by weight, based on the weight of the powdered adsorbent. The solvent in the solvent solution of the resinous binder will be sufficient to maintain the binder in solution in the aerosol dispersion, and in general will range between about nine times and about forty-nine times the weight of the binder, i.e. sufficient to produce solvent solutions containing between about 2% and about 10% binder in the combined binder-solvent solution.

The binder should be present in the aerosol compositions in the range of about 0.85% to about 12% by weight, preferably about 1% to about 6%, particularly about 1% to about 4.5%.

The dispersion means used in the aerosol compositions of this invention has a dual function. It serves to dissolve the binder so as to render it compatible with the remainder of the aerosol composition. It also serves to disperse the adsorbent powder, so as to render it easily dispensable. It generally consists of at least one solvent and at least one diluent. The dispersion means should be present in the aerosol compositions in the range of about 10% to about 78% by weight, preferably about 37% to about 76%, and particularly about 44% to about 64%.

The solvent functions to dissolve the binder so as to render it compatible with the remainder of the aerosol composition. In order to dissolve the binder in the solvent it is necessary to reflux the solvent with the binder until the binder dissolves. Solvents which have been found to be suitable are aliphatic monohydric alcohols having from 1-4 carbon atoms, dimethyl formamide, dimethyl sulfoxide, ethylene glycol monoethyl ether acetate (Cellosolve acetate), diacetone alcohol, ethers having from 3-6 carbon atoms (including those containing hydroxyl or acetate groups), saturated fluoro- and chlorofluoro-ketones having from 3-6 carbon atoms, and their hydrates, and mixtures thereof.

Ethanol has been found to be the preferred solvent due to the fact that it exhibits little or no tendency to corrode the aerosol containers.

The solvent can be present in the compositions of this invention up to about 75% by weight, preferably from about 25% to about 50% by weight.

The diluent is used in the aerosol compositions of this invention to provide a dispersion medium for the adsorbent. The diluent must suspend the powdered adsorbent to such a degree as to require little agitation before spraying. The diluent used in the aerosol compositions of this invention functions primarily as a dispersion medium for the powdered adsorbent. Certain diluents also function as flame suppressants. The diluent used must have a sufficiently slow rate of evaporation that it will not evaporate so rapidly that the aerosol spray strikes the backing plate in the form of a powder, i.e. liquid diluent should still be present in the spray when the spray strikes the backing plate. However, the diluent must evaporate sufficiently rapidly so as to preclude a long drying time for the coated backing plate. A drying time of not more than about 10 to 20 minutes is considered ot be acceptable. Upon mixing with the adsorbent powder, such a diluent should produce a colloidal dispersion which tends to hold the powder in suspension over a long period of time, and, when combined with the propellant in the aerosol container, requires little agitation before use. The diluents which have been found to be suitable in the aerosol compositions of this invention are saturated and unsaturated chlorinated hydrocarbons having 1–3 carbon atoms, saturated and unsaturated chlorofluorinated hydrocarbons having 1–4 carbon atoms, alkyl acetates having from 3–6 carbon atoms, ketones having from 3–6 carbon atoms, benzene, methylated benzene, mono- and dichlorinated benzene, and saturated and unsaturated aliphatic hydrocarbons having from 5–10 carbon atoms. The most suitable diluents have been found to be dichlorofluoromethane; 1,1,2,2 - tetrachloro - 1,2-difluoroethane; 1,1,2-trichloroethylene; 1,2-dichloropropane; monochlorobenzene; and 1,1,2-trichloroethane, the preferred diluents being 1,1,2-trichloroethane and 1,2-dichloropropane.

The diluent can be present in the aerosol compositions of this invention from about 0% to about 45% by weight, preferably about 5 to about 35% by weight (when 0% by weight diluent is used, the propellant and solvent must be of such a character as to either singly or together comprise an effective diluent having the above-mentioned characteristics, such as in Example XIV where the solvent hexafluoroacetone trihydrate serves also as a diluent). Although the chief function of the diluent is to serve as a dispersion medium, it also often serves a solvent function aiding the solvent in dissolving the binder.

The propellants which are used in the aerosol compositions of this invention must be miscible with the other components of the composition, must not cause agglomeration of the composition even over extended periods of time, (i.e. up to a year or more) and must generate sufficient force upon spraying to force the dispersed adsorbent out of the aerosol container and onto the plates but must not provide such force as to blast and ripple the applied coating. The useful range of pressure for the propellant used in the compositions of this invention is about 20 to about 400 p.s.i.g., preferably about 30 to about 55 p.s.i.g. Ideally the propellant should be non-flammable and nontoxic to the user and it must be a gas at room temperature and pressure. The following propellants, which are either liquefied gases or compressed gases under the pressures used in the aerosol containers, have been found to be suitable: saturated and unsaturated aliphatic halogenated hydrocarbons having from 1 to 4 carbon atoms such as vinyl chloride and monochlorodifluoromethane; inert gases such as carbon dioxide and nitrogen, and mixtures thereof. Certain pressurized hydrocarbons such as propane, butane and isobutane can also be used. The most suitable propellants have been found to be the chlorofluorinated saturated hydrocarbons having from 1 to 4 carbon atoms, the preferred propellants being dichlorodifluoromethane and monochlorodifluoromethane.

The range of propellant in the compositions of this invention can be from about 15% to about 50% by weight, preferably from about 15% to about 35% by weight, particularly from about 17% to about 30%.

The spray container used to dispense the aerosol compositions of this invention can be any conventional aerosol container, such as a tin-plate or lined tin-plate container. However, it has been found that best results are achieved if the aerosol container used has a powder dispensing type of valve rather than the liquid dispensing type of valve generally found on aerosols, since the adsorbent powder tends to jam the latter type of valve.

The following are examples of the aerosol compositions of our invention.

EXAMPLE I

| | G. |
|---|---|
| Powdered silica gel | 20 |
| Versamid 940 | 2 |
| Toluene | 9 |
| Ethanol | 39 |
| Dichlorodifluoromethane | 30 |
| | 100 |

EXAMPLE II

| | G. |
|---|---|
| Powdered silica gel | 20 |
| Elvamide 8061 | 2 |
| Methanol | 18 |
| Ethanol | 30 |
| Dichlorodifluoromethane | 30 |
| | 100 |

EXAMPLE III

| | G. |
|---|---|
| Powdered silica gel | 20 |
| Elvamide 8061 | 1 |
| Methanol | 9 |
| Ethanol | 40 |
| Dichlorodifluoromethane | 30 |
| | 100 |

EXAMPLE IV

| | G. |
|---|---|
| Powdered silica gel | 25 |
| Elvamide 8061 | 1 |
| Methanol | 9 |
| Ethanol | 35 |
| Dichlorodifluoromethane | 30 |
| | 100 |

EXAMPLE V

| | G. |
|---|---|
| Powdered silica gel | 20 |
| Elvamide 8061 | 2 |
| Methanol | 18 |
| Isoamyl alcohol | 10 |
| Trichlorotrifluoroethane | 20 |
| Dichlorodifluoromethane | 30 |
| | 100 |

EXAMPLE VI

| | G. |
|---|---|
| Powdered silica gel | 15.0 |
| Elvamide 8061 | 1.5 |
| Methanol | 26.0 |
| Dichlorofluoromethane | 17.5 |
| Difluorotetrachloroethane | 15 |
| Dichlorodifluoromethane | 25 |
| | 100 |

EXAMPLE VII

| | G. |
|---|---|
| Powdered silica gel | 20 |
| Elvamide 8061 | 1.5 |
| Methanol | 28.5 |
| 1,1,2-trichloroethylene | 20 |
| Dichlorodifluoromethane | 30 |
| | 100 |

EXAMPLE VIII

| | G. |
|---|---|
| Powdered silica gel | 15 |
| Elvamide 8063 | 0.9 |
| Ethanol | 29.2 |
| 1,1,2-trichloroethane | 24.9 |
| Dichlorodifluoromethane | 19.5 |
| Vinyl chloride | 10.5 |
| | 100 |

EXAMPLE IX

| | G. |
|---|---|
| Powdered silica gel | 15 |
| Elvamide 8063 | 1.0 |
| Ethanol | 36.8 |
| 1,1,2-trichloroethane | 27.2 |
| Monochlorodifluoromethane | 20 |
| | 100 |

EXAMPLE X

| | G. |
|---|---|
| Powdered silica gel | 20 |
| Silicone Varnish D.C. 997 | 3 |
| Iso octane | 5 |
| Methylene chloride | 10 |
| Ethanol | 17 |
| Xylene | 20 |
| Dichlorodifluoromethane | 25 |
| | 100 |

EXAMPLE XI

| | G. |
|---|---|
| Powdered silica gel | 15 |
| Elvamide 8061 | 1.4 |
| Methanol | 26.1 |
| Difluorotetrachloroethane | 32.5 |
| Dichlorodifluoromethane | 25 |
| | 100 |

EXAMPLE XII

| | G. |
|---|---|
| Powdered silica gel | 15 |
| Elvamide 8061 | 1.5 |
| Methanol | 28.5 |
| 1,1,2-trichloroethane | 25 |
| Dichlorodifluoromethane | 30 |
| | 100 |

EXAMPLE XIII

| | G. |
|---|---|
| Powdered silica gel | 15 |
| Elvamide 8063 | 1.5 |
| Ethanol | 28.5 |
| 1,1,2-trichloroethane | 25 |
| Dichlorodifluoromethane | 30 |
| | 100 |

EXAMPLE XIV

| | G. |
|---|---|
| Powdered silica gel | 10 |
| 5% by weight solution of nylon 6 in hexafluoroacetone trihydrate | 15 |
| Hexafluoroacetone trihydrate | 20 |
| Sufficient $CO_2$ to pressurize to 90 p.s.i.g. | |

EXAMPLE XV

| | G. |
|---|---|
| Powdered silica gel | 10 |
| 5% by weight solution of nylon 66 hexafluoroacetone trihydrate | 15 |
| Hexafluoroacetone trihydrate | 20 |
| Sufficient $CO_2$ to pressurize to 90 p.s.i.g. | |

EXAMPLE XVI

| | G. |
|---|---|
| Powdered silica gel | 10 |
| 5% by weight solution of nylon 610 in hexafluoroacetone trihydrate | 15 |
| Hexafluoroacetone trihydrate | 20 |
| Sufficient $CO_2$ to pressurize to 90 p.s.i.g. | |

EXAMPLE XVII

| | G. |
|---|---|
| Powdered silica gel | 10 |
| 5% by weight solution of nylon 10 in hexafluoroacetone trihydrate | 15 |
| Hexafluoroacetone trihydrate | 20 |
| Sufficient $CO_2$ to pressurize to 90 p.s.i.g. | |

EXAMPLE XVIII

| | G. |
|---|---|
| Powdered silica gel | 10 |
| 5% by weight solution of nylon 11 in hexafluoroacetone trihydrate | 15 |
| Hexafluoroacetone trihydrate | 20 |
| Sufficient $CO_2$ to pressurize to 90 p.s.i.g. | |

EXAMPLE XIX

| | G. |
|---|---|
| Powdered cellulose | 10 |
| Elvamide 8063 | 1.0 |
| Ethanol | 36.8 |
| 1,1,2-trichloroethane | 32.2 |
| Monochlorodifluoromethane | 20.0 |
| | 100 |

EXAMPLE XX

| | G. |
|---|---|
| Powdered silica gel | 15 |
| Elvamide 8063 | 1 |
| N,N-dimethyl formamide | 19 |
| Ethanol | 17.8 |
| 1,1,2-trichloroethane | 27.2 |
| Monochlorodifluoromethane | 20 |
| | 100 |

EXAMPLE XXI

| | G. |
|---|---|
| Powdered silica gel | 20 |
| 10% by weight solution of Elvamide 8061 in methanol | 15 |
| Methylene chloride | 10 |
| 1,2,4-trichlorobenzene | 5 |
| 1,1,2-trichloroethane | 20 |
| Dichlorodifluoromethane | 30 |
| | 100 |

EXAMPLE XXII

| | G. |
|---|---|
| Powdered silica gel | 10 |
| 5% by weight solution of nylon 6–10 in dichlorotetrafluoroacetone trihydrate | 15 |
| Dichlorotetrafluoroacetone trihydrate | 20 |
| Sufficient pressure to pressurize to 90 p.s.i.g. | |

EXAMPLE XXIII

| | G. |
|---|---|
| Powdered silica gel | 20 |
| 10% by weight solution of Elvamide 8061 in methanol | 20 |
| 1,1,2-trichloroethane | 30 |
| Ethyl acetate | 5 |
| Dichlorodifluoromethane | 25 |
| | 100 |

EXAMPLE XXIV

| | G. |
|---|---|
| Powdered silica gel | 20 |
| 10% by weight solution of Elvamide 8061 in methanol | 20 |
| 1,1,2-trichloroethane | 30 |
| Methyl ethyl ketone | 5 |
| Dichlorodifluoromethane | 25 |
| | 100 |

EXAMPLE XXV

| | G. |
|---|---|
| Powdered silica gel | 20 |
| Versamide 940 | 2 |
| Toluene | 4 |
| Benzene | 5 |
| Ethanol | 39 |
| Dichlorodifluoromethane | 30 |
| | 100 |

EXAMPLE XXVI

| | G. |
|---|---|
| Powdered silica gel | 20 |
| 10% by weight solution of Elvamide 8061 in methanol | 20 |
| 1,1,2-trichloroethane | 30 |
| Diacetone alcohol | 5 |
| Dichlorodifluoromethane | 25 |
| | 100 |

EXAMPLE XXVII

| | G. |
|---|---|
| Powdered silica gel | 20 |
| Silicone Varnish D.C. 997 | 3 |
| Pentane | 5 |
| Methylene chloride | 10 |
| Ethanol | 17 |
| Xylene | 20 |
| Dichlorodifluoromethane | 25 |
| | 100 |

EXAMPLE XXVIII

| | G. |
|---|---|
| Powdered silica gel | 20 |
| Silicone Varnish D.C. 997 | 3 |
| n-1-heptene | 5 |
| Methylene chloride | 10 |
| Ethanol | 17 |
| Xylene | 20 |
| Dichlorodifluoromethane | 25 |
| | 100 |

EXAMPLE XXIX

| | G. |
|---|---|
| Powdered silica gel | 20 |
| Silicone Varnish D.C. 997 | 3 |
| n-1-decene | 5 |
| Methylene chloride | 10 |
| Ethanol | 17 |
| Xylene | 20 |
| Dichlorodifluoromethane | 25 |
| | 100 |

EXAMPLE XXX

| | G. |
|---|---|
| Powdered diatomaceous earth | 10 |
| Elvamide 8063 | 1.0 |
| Ethanol | 36.8 |
| 1,1,2-trichloroethane | 32.2 |
| Monochlorodifluoromethane | 20.0 |
| | 100 |

EXAMPLE XXXI

| | G. |
|---|---|
| Powdered alumina | 15 |
| Elvamide 8063 | 1.0 |
| Ethanol | 36.8 |
| 1,1,2-trichloroethane | 27.2 |
| Monochlorodifluoromethane | 20.0 |
| | 100 |

EXAMPLE XXXII

| | G. |
|---|---|
| Powdered silica gel | 15 |
| Elvamide 8063 | 1 |
| Ethanol | 38.5 |
| Monochloro benzene | 15 |
| Methylene chloride | 10 |
| Butyl acetate | 0.5 |
| Monochlorodifluoromethane | 20 |
| | 100 |

EXAMPLE XXXIII

| | G. |
|---|---|
| Powdered silica gel | 15 |
| Elvamide 8063 | 1 |
| Ethanol | 40 |
| 1,2-dichloropropane | 27 |
| Monochlorodifluoromethane | 17 |
| | 100 |

EXAMPLE XXXIV

| | G. |
|---|---|
| Powdered polytetrafluoroethylene resin | 15 |
| Elvamide 8063 | 1.0 |
| Ethanol | 36.8 |
| 1,1,2-trichloroethane | 27.2 |
| Monochlorodifluoromethane | 20 |
| | 100 |

EXAMPLE XXXV

| | G. |
|---|---|
| Powdered silica gel | 15 |
| Powdered polyacrylonitrile resin | 2 |
| N,N-dimethyl formamide | 63 |
| Monochlorodifluoromethane | 20 |
| | 100 |

EXAMPLE XXXVI

| | G. |
|---|---|
| Powdered silica gel | 20 |
| Elvamide 8061 | 2 |
| Methanol | 48 |
| Dichlorodifluoromethane | 30 |
| | 100 |

EXAMPLE XXXVII

| | G. |
|---|---|
| Powdered silica gel | 15.0 |
| Elvamide 8063 polyamide resin | 2.6 |
| Ethanol | 36.4 |
| Methylene chloride | 26.0 |
| Monochlorodifluoromethane | 20.0 |
| | 100 |

EXAMPLE XXXVIII

| | G. |
|---|---|
| Microcrystalline cellulose | 15.0 |
| Elvamide 8063 | 1.0 |
| Ethanol | 36.8 |
| 1,1,2-trichloroethane | 27.2 |
| Monochlorodifluoromethane | 20.0 |
| | 100 |

EXAMPLE XXXIX

| | G. |
|---|---|
| Powdered silica gel | 15.0 |
| Araldite 488 N-40 epoxy resin | 4.0 |
| Monochlorodifluoromethane | 20.0 |
| Cellosolve acetate | 30.0 |
| Methylene chloride | 31.0 |
| | 100 |

EXAMPLE XXXX

| | G. |
|---|---|
| Powdered silica gel | 15.0 |
| Vithane 100 polyurethane resin | 2.0 |
| Monochlorodifluoromethane | 20.0 |
| Dimethyl sulfoxide | 23.0 |
| Methyl ethyl ketone | 40.0 |
| | 100 |

The particular ethanol used in the composition of many of the above examples was U.S. Government Specification SDA 40.

In preparing plates from the compositions which contain silicone varnishes as binders it may be desirable to heat the coated plates slightly to solidify the binder.

The compositions of the examples were tested by placing a clean glass plate in a horizontal position and spraying it with slightly overlapping strokes from an aerosol container containing the composition held about 6 to 10 inches vertically above it. Each completed plate was first visually inspected for such coating defects as rippling, bubbles, powderiness, and runniness. The plates which passed the visual examination test were then further tested by spotting with a standard, commercially available separation-testing dye soluble. Such dye solutions contain a known number of components. (An example of such a solution is a triple dye mix marketed by Brinkmann Instruments, Inc. of Westbury, N.Y.) The solution was spotted on the plate and separated into components by the previously outlined thin-layer chromatography separation and development technique. If a distinct separation of the proper number of components was evident on visual examination, the coating composition was satisfactory. All the compositions tested were found to be satisfactory; however, the compositions of Examples III, IV, VI, VII, IX and XXXVII were found to be superior. The composition of Example IX is particularly outstanding in that it shows little tendency to corrode the aerosol container. The composition of Example XXXVII was also found to be particularly outstanding.

It is estimated that under normal use 10 to 15 chromatographic plates (20 x 20 cm.) can be sprayed from a single 16 ounce aerosol container. However, smaller size plates are easier to coat evenly.

Stability tests were run on aerosol containers containing the composition of Example IX. Some of the containers were put in an oven at 125° F. to simulate the most adverse storage conditions. Other containers were left at room temperature. Some of the containers were also subjected to low temperature (about −20° F.). The containers were tested at one month intervals by shaking and then spraying. No adverse affects such as agglomeration in the can or poor plate coating were noted, and the cans still functioned well and produced good coatings after two months of such tests. Since these tests were conducted at extreme conditions, they indicate a much longer shelf life under normal conditions of use.

While this invention has been described with particular reference to specific embodiments it is to be understood that it is not to be limited thereto but is to be construed broadly and restricted solely by the scope of the appended claims.

We claim:

1. In a self propelled non-aqueous aerosol composition for coating plates for use in thin-layer chromatography consisting essentially of (a) a powdered adsorbent having an average particle size no greater than about 60 microns, (b) a liquid dispersion medium for the powdered adsorbent and (c) a propellant consisting of a compressed gas or a liquefied gas, the improvement which comprises including in said aerosol composition, (d) a solvent solution of a synthetic resin binder selected from the group consisting of polyacrylonitrile resins, polyethylene terephthalate resins, polyurethane resins and polyamide resins, said solvent in which the synthetic resin binder is dissolved being selected from the group consisting of aliphatic monohydric alcohols of 1 to 4 carbon atoms, dimethyl formamide, dimethyl sulfoxide, ethylene glycol, monoethyl ether acetate, diacetone alcohol, ethers having from 3 to 6 carbon atoms, saturated fluoroketones and chlorofluoroketones having from 3 to 6 carbon atoms, hydrates of said ketones, and mixturse of said solvents; and said synthetic resin binder being present in an amount between about 4% and about 17.3% by weight, based on the weight of the powdered adsorbent, said solvent in which said synthetic resin binder is dissolved being present in an amount between about 9 times and about 49 times the weight of the synthetic resin binder.

2. The composition of claim 1 wherein the synthetic resin binder is a synthetic polyamide resin binder selected from the group consisting of (1) a thermoplastic resinous reaction product of dimerized linoleic acid with ethylene diamine, said reaction product having a molecular weight in the range of 6000 to 9000, softening point range from 90° to 190° C., and an amine value from 83 to 400, (2) a nylon resin selected from the group consisting of polycaprolactam, polyhexamethylene adipamide, polyhexamethylene sebacamide, polyaminodecanoic acid, polyaminoundecanoic acid and an interpolyamide consisting essentially of X parts by weight of poly-6-aminocaproic acid, Y parts by weight of polyhexamethylene diammonium sebacate, Z parts by weight of polyhexamethylene diammonium adipate, and T parts of a mixture of polyhexamethylene diammonium suberate and polyhexamethylene diammonium azelate, in approximately 15:85 to 30:70 proportions by weight, wherein $X+Y+Z+T$ equals 100 and the individual values of Y, Z and T are determined for any value of X according to the following expression:

$$X = 4 + 0.0073(T-45)^2 + 0.0322[Y-13-0.0043(T-53)^2]^2$$

3. The composition according to claim 2 wherein the powdered adsorbent is a member selected from the group consisting of silica gel, alumina, diatomaceous earth, polytetrafluoroethylene, polychlorotrifluoroethylene, magnesium silicate, carbon, magnesiasilica gel, cellulose, microcrystalline cellulose, carboxymethyl cellulose and diethylamino-ethyl ion exchange cellulose.

4. The composition according to claim 2 wherein the powdered adsorbent is silica gel.

5. The composition of claim 2 wherein polyamide resin binder is an interpolyamide consisting essentially of X parts by weight of poly-6-aminocaproic acid, Y parts by weight of polyhexamethylene diammonium sebacate, Z parts by weight of polyhexamethylene diammonium adipate and T parts by weight of a mixture of polyhexamethylene diammonium suberate and polyhexamethylene diammonium azelate in approximately 15:85 to 30:70 proportions by weight, wherein $X+Y+Z+T$ equals 100 and the individual values of Y, Z and T are determined for any value of X, according to the expression:

$$X = 4 + 0.0073(T-45)^2 + 0.0322[Y-13-0.0043(T-53)^2]^2$$

6. The composition of claim 2 wherein the polyamide resin binder constitutes from about 0.85% to about 12% by weight of the composition and the solvent constitutes from about 25% to about 75% by weight of the composition.

7. The composition of claim 6 wherein the polyamide resin binder constitutes from about 1% to about 6% by weight of the composition and the solvent constitutes from about 25% to about 50% by weight of the composition.

8. The composition of claim 2 wherein the dispersion medium is a mixture consisting of at least two members selected from the group consisting of ethanol, 1,1,2-trichloroethane, 1,2-dichloropropane and methylene chloride; and the propellant is monochlorodifluoromethane.

9. The method of preparing thin-layer chromatography plates by securely binding an adsorbent powder layer to a backing plate, which comprises coating the backing plate with a non-aqueous aerosol composition containing powdered adsorbent particles of about 60 microns to about 1 micron particle size dispersed in a volatile solution of a synthetic binder selected from the group consisting of polyacrylonitrile resins, polyethylene terephthalate resins, polychlorotrifluoroethylene resins, polyurethane resins and polyamide resins, said solvent in which the synthetic resin binder is dissolved being selected from the group consisting of aliphatic monohydic alcohols of 1 to 4 carbon atoms, dimethyl formamide, dimethyl sulfoxide, ethylene glycol monoethyl ether acetate, diacetone alcohol, ethers having from 3 to 6 carbon atoms, saturated fluoroketones and chlorofluoroketones having from 3 to 6 carbon atoms, hydrates of said ketones, and mixtures of said solvents, said synthetic resin binder being present in an amount between about 4% and about 17.3% by weight, based on the weight of the powdered adsorbent, said solvent in which said synthetic resin binder is dissolved being present in an amount between about 9 times and about 49 times the weight of the synthetic resin binder.

References Cited

UNITED STATES PATENTS 3,361,679   1/1968   Paulus _____ 252—302
3,468,814   9/1969   Dernier et al. _____ 252—408

RICHARD D. LOVERING, Primary Examiner

P. E. WILLIS, Assistant Examiner

U.S. Cl. X.R.

252—305; 210—31